United States Patent [19]
Yamamoto

[11] 4,302,816
[45] Nov. 24, 1981

[54] KEY INPUT CONTROL APPARATUS

[75] Inventor: Haruo Yamamoto, Sayama, Japan

[73] Assignee: Casio Computer Co., Ltd., Tokyo, Japan

[21] Appl. No.: 50,512

[22] Filed: Jun. 20, 1979

[30] Foreign Application Priority Data

Jun. 29, 1978 [JP] Japan ................................ 53-78905

[51] Int. Cl.³ .............................................. G06F 7/48
[52] U.S. Cl. .................................................. 364/709
[58] Field of Search ............................. 364/709, 754

[56] References Cited

U.S. PATENT DOCUMENTS

3,597,600  8/1971  Herendeen .......................... 364/709
3,914,587 10/1975  Haines ................................ 364/709
4,158,233  6/1979  Olander, Jr. et al. ............... 364/754

*Primary Examiner*—David H. Malzahn

*Attorney, Agent, or Firm*—Frishauf, Holtz, Goodman & Woodward

[57] ABSTRACT

A key input control apparatus is provided with a key input unit having a plurality of keys including a special key with an entry function and a calculation designating function. The output signals provided from keys depressed in the key input unit are stored in a memory unit in the order of the key depressions. When the special key is depressed, a logic circuit executes a given calculation designating function assigned to the special key in accordance with the output signal, which has been stored corresponding to the kinds of the keys in the memory unit, taken out from the memory unit. The operation specified by the logic circuit is executed by an arithmetic logic circuit. Data keyed in from the key input unit or result of the operation executed on the basis of the data keyed in is displayed by a display unit.

17 Claims, 19 Drawing Figures

FLIP FLOP 13   FLIP FLOP 15
         | 0 | 0 |

|     | KEY |        |                      |
|-----|-----|--------|----------------------|
| (a) | 2   | | 1 | 0 | X | 2 | 0 | 0 | P F  H |
|     |     |        | 2.  — 26 |
| (b) | a b/c | | 0 | 1 | X | 2 ⌐ 0 4 | H |
|     |     |        | 2 ⌐ .  — 26 |
| (c) | 3   | | 1 | 1 | X | 2 ⌐ 3 0 4 | H |
|     |     |        | 2 ⌐ 3.  — 26 |
| (d) | a b/c | | 0 | 1 | X | 2 ⌐ 3 ⌐ 0 4 | H |
|     |     |        | 2 ⌐ 3 ⌐.  — 26 |
| (e) | 4   | | 1 | 1 | X | 2 ⌐ 3 ⌐ 4 0 4 | H |
|     |     |        | 2 ⌐ 3 ⌐ 4.  — 26 |
| (f) | π   | M | 3 1 4 1 5 9 2 6 5 4 9 0 | — 25 |
|     |     | | 1 | 0 | X | 2 7 5 2 0 | H |
|     |     | | 1 | 0 | X | 8 6 3 9 3 7 9 7 9 8 9 0 | H |
|     |     |        | 8.6 3 9 3 7 9 7 9 8  — 26 |
| (g) | Sin | | 1 | 0 | X | 7 0 7 1 0 6 7 8 1 9 0 | H |
|     |     |        | 0.7 0 7 1 0 6 7 8 1  — 26 |

KEY INPUT CONTROL APPARATUS

BACKGROUND OF THE INVENTION

The invention relates to a key input control apparatus used for a small sized electronic calculator.

Some electronic calculators such as desk-top type electronic calculators are provided with an extra key, for example a ⑰ key. When the ⑰ key is depressed, the numeral "3.1415 ..." is keyed in by a single keying operation in place of a plurality of keying operations of the ten keys representing the respective numerals '3', '1', '4', '1', '5', ... of "3.1415 ...". When the ⑰ key is operated, a calculation as in the case of the ten key operation must be performed. In the calculation of "sin $\frac{3}{4}\pi$", for example, keys are operated in the order of

[3] [×] [π] [÷] [4] [=] [sin]   or

[3] [a b/c] [4] [×] [π] [=] [sin].

The key is a command key to command the calculation of a fraction. Thus, in the conventional calculator, the extra ⑰ key is treated like the ten key and therefore the calculation needs the keying operation of a function key to command the calculation after the ⑰ key is operated. Therefore, the keying operation is complicated. This creates a problem, particularly in the calculation of polynomial. In other words, in such a calculation, since the keying operation is complicated, the calculation must be carefully performed to avoid erroneous keying operations which are highly possible to occur.

In a calculation requiring a repeat of keying operations of the key, for example, the calculation of "$\pi$ sin $\frac{3}{4}\pi$", the keying operation is carried out in the order of keys [3] [×] [π] [÷] [4] [=] [sin] [×] [π] [=]. That is to say, the key operation is very complicated.

Accordingly, an object of the present invention is to provide a key input control apparatus in which an entry function or a calculation function of a special key is selectively executed in accordance with a key operation performed immediately before the extra key with such functions is operated, thereby simplifying the key operation.

SUMMARY OF THE INVENTION

In order to achieve the above-mentioned objects, there is provided a key input control apparatus comprising: key input means with keys including a special key with an entry function and a calculation designating function; memory means for storing the signals provided from keys depressed in the key input means in the order of the key operations; means which, when the special key is operated, executes a given calculation designating function assigned to the special key in accordance with the output signal, which has been stored corresponding to the kinds of the keys in the memory means, taken out from the memory means; means for executing a calculation specified by the means for executing the given calculation designating function; and display means which is connected to the key input means and the arithmetic logic means, and displays data keyed in from the key input means or the result of the operation executed on the basis of the data keyed in.

With such a construction, the entry function and/or the calculation designating function of the special key is selected by the signal provided from a key depressed immediately before the special key is operated. Therefore, the key operation is simplified, minimizing an erronous key operation.

DETAILED DESCRIPTION

Figure 1:
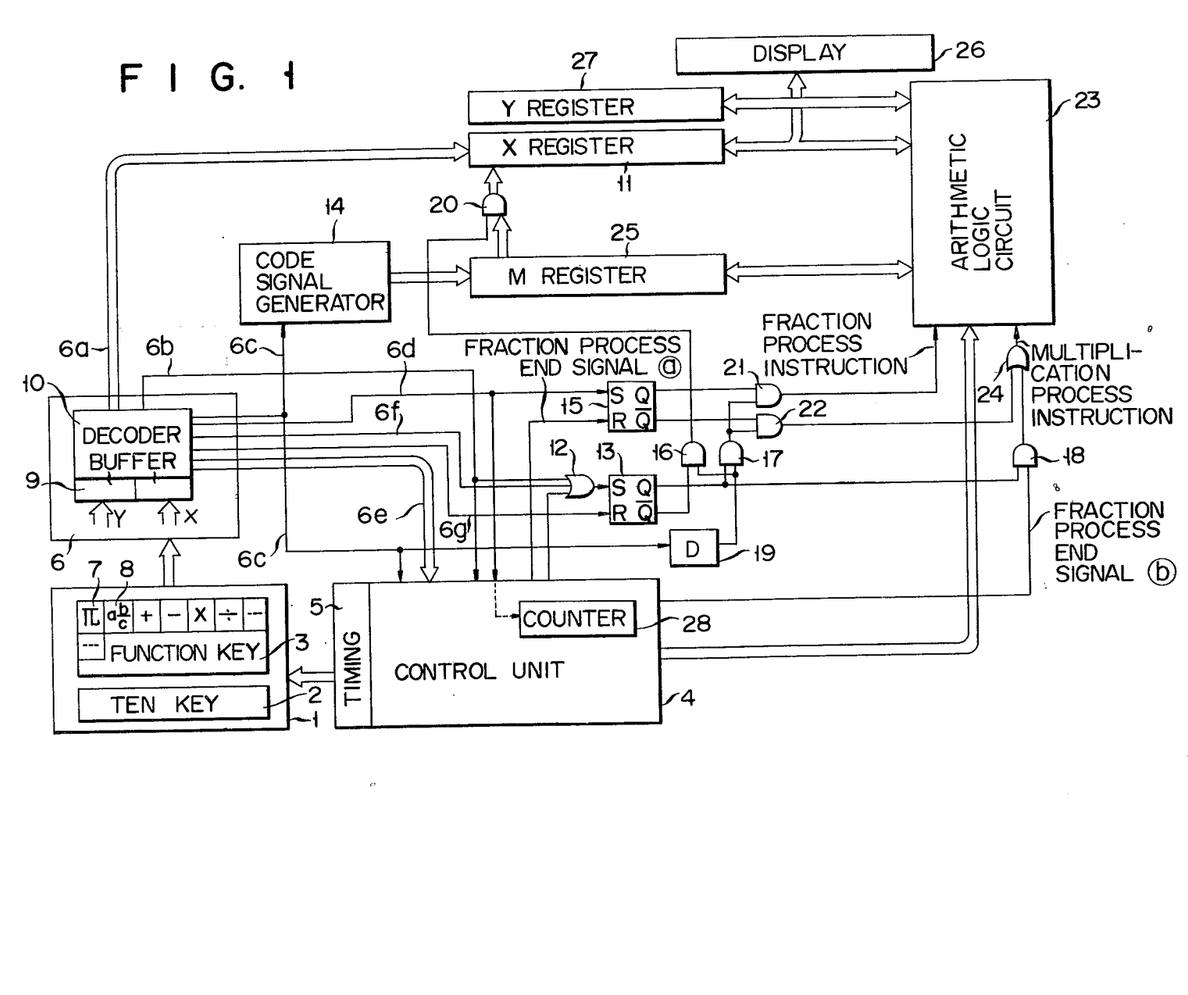
FIG. 1 shows a block diagram of an embodiment of a key input control apparatus according to the invention.

As shown in FIG. 1, a key input unit 1 is provided with a ten key 2 and a function key 3. In accordance with a key sampling signal derived from a timing setter 5 in a control unit 4, the key input unit 1 delivers a signal corresponding to the key operated in the key input portion 1 to an input processing portion 6. The function key 3 includes a key for arithmetic operation commanding an arithmetic operation, a key 7, an key 8 and the like. The input processing portion 6 includes a buffer portion 9 receiving the signal corresponding to the key depressed in the key input portion 1 and a decoder 10 for decoding an output signal from the buffer portion 9. The decoder 10 has output lines 6a to 6g: the output line 6a carries numerical data; the output line 6b a numerical key signal; an output line 6c a ⑰ key signal; the output line 6d a key signal; the output line 6e a function key signal. The output line 6f deliveres a signal from a key of which the key operation after numerical data is inputted immediately causes an operation and ends the operation. Such a signal is a first function signal produced by a key called a 1 function key such as a trigonometric function key. The output line 6g delivers a second function signal provided by one of the other keys than the first function key, i.e. the keys of which the key operation after the numerical data is inputted does not cause a substantial operation, for example, [+], [−], [×], [÷] keys, and the like. The first function signal is produced by depressing the first function key and a +/- key for sign change as well. The numerical data delivered from the output line 6a of the input processing portion 6 is applied to an X register 11. The numerical key signal delivered from the output line 6b is applied to the control unit 4 and to the set terminal S of a flip-flop 13 by way of an OR circuit 12. The π key signal delivered through the output line 6c is applied to a code generator 14 and the control unit 4. The key signal delivered through the output line 6d is applied to the set terminal of a flip-flop 15 and, together with the function key signal delivered through the output line 6e, is sent to the control unit 4. The first function signal delivered from the output line 6f is applied to the set terminal of the flip-flop 13, through the OR circuit 12. The second function signal coming through the output line 6g is applied to the reset terminal R of the flip-flop 13. The set terminal S of the flip-flop 13 is supplied with the numerical key signal, the first function signal, and a processing end signal which is applied through the OR circuit 12. The output signal from the output Q of the flip-flop 13 is applied to one of the input terminals of an AND circuit 16 while the output signal from the output $\overline{Q}$ is applied to one input terminals of AND circuits 17 and 18. The π key signal from the output line 6c is applied through a delay circuit 19 to the other input terminals of the AND gates 16 and 17. The output signal from the AND gate 16 is applied to an AND gate 20. The output signal from the AND gate 17 is applied to AND gates 21 and 22. The AND gates 21 and 22 are also coupled at the inputs with the outputs Q and $\overline{Q}$ of the flip-flop 15. The output signal from the AND gate 21 is applied as a fraction processing command to an arithmetic logic circuit 23. The output signal from the AND circuit 22 is applied as a multiplication processing command to an OR circuit 24 and then to the arithmetic logic circuit 23. Applied to the OR circuit 24 is a fraction processing end signal ⓑ outputted from the control unit 4 by way of the AND circuit 18. The fraction processing end signal ⓑ is produced from the control unit 4 at the time that the π key 7 is depressed and the fraction processing ends. The control unit 4 produces another fraction processing end signal ⓐ in addition to the signal ⓑ. The signal a is produced at the time that the fraction processing ends irrespective of the operation of the π key 7, and is applied as a reset signal to the flip-flop 15. When receiving the π key signal from the input processing portion 6, the code generator 14 produces a coded signal representing pi, "3.1415..." and transmits it to an M register 25 for data transfer to and from the arithmetic logic circuit 23. When the AND circuit 20 is enabled by the output signal from the AND gate 16, the contents of the M register 25 is transferred to the X register 11. The X register 11 is combined with the arithmetic logic circuit 23 to act as an arithmetic/display register. The contents of the X register is applied to a display unit 26 where it is visualized. A Y register 27 for arithmetic operation is further connected to the arithmetic logic circuit 23. In addition to those X and Y registers 11 and 27, the arithmetic logic circuit 23 contains working registers for properly executing an arithmetic operation.

The operation of the key input control apparatus thus constructed will be given. In the key input unit 1, when a key is operated, the input processing portion 6 produces a signal corresponding to the key which is turn is subjected to an arithmetic operation in the arithmetic logic circuit 23 by using the M register 25, the Y register 27 and the working registers within the arithmetic logic circuit 23. The key input control apparatus according to the invention is roughly so desiged that a special key such as the π key 7 has two functions, an entry function and a calculation designating function, and one or both of them is selectively executed in response to the key operation of a key, which is not the special key, immediately before the special key is operated.

The explanation to follow is the elaboration of the operation of the key input control apparatus when "cos π+2π" is calculated. Reference will be made to FIGS. 2(a) to 2(f) which illustrate operated keys and the contents of the related registers. For this calculation, keys, π, cos, +, 2, π, = are depressed in this older. When the first key, the π key, 7 is operated, the input processing unit 6 produces a π key signal through the output line 6c and then is applied to the code signal generator 14. The code signal generator 14, upon receipt of the π key signal from the input processing unit 6, produces a coded signal representing "3.1415..." and applies it to the M register 25 for one word time. The M register 25, the X register 11 and the Y register 27 ae each provided with a digit P for storing data of a decimal fraction and a flag F for storing data to designate an operation. When a numerical value pi "π" is stored in the M register, "9" representing the number of digits of the decimal fraction in the pi is stored in the digit P of the M register 25. The π key signal outputted from the input processing portion 6 is fed to the code generator 14 and also to the AND gates 16 and 17 through the delay circuit 19 which delays it by one word. At this time, the flip-flop 13 is in a reset state so that it produces at the output $\overline{Q}$ a signal of logical "1" which in turn is applied to the AND gate 16. When the delay circuit 19 produces the π key signal, the AND circuit 16 produces a signal of "1" which in turn enables the AND gate 20. As a result, the numerical value of "π" set in the M register 25 is transferred to the X register 11 through the AND gate 20 during the next one word time. The pi transferred to the X register 11 is transferred to the display unit 26 where the numerical value "3.141592654" is displayed. As the processing of the pi ends, the control unit 4 produces a pi processing end signal which in turn goes through the OR circuit 12 to set the flip-flop 13 (FIG. 2(a)). Then, the cos key is depressed so that the output line 6e of the input processing unit 6 produces function data consisting of a plurality of bits corresponding to the cos key for transmission to the control unit 4. Since the cos key belongs to the first function key, the output line 6f delivers the first function signal to set the flip-flop 13 through the OR circuit 12. Responsive to the function data, the control unit 4 produces an output signal to control the arithmetic control circuit 23 to calculate "cos π". The result "−1" of the calculation is then loaded into the X register 11. In this case, therefore, "−1" is dislayed by the display unit (FIG. 2(b)).

Figure 2:
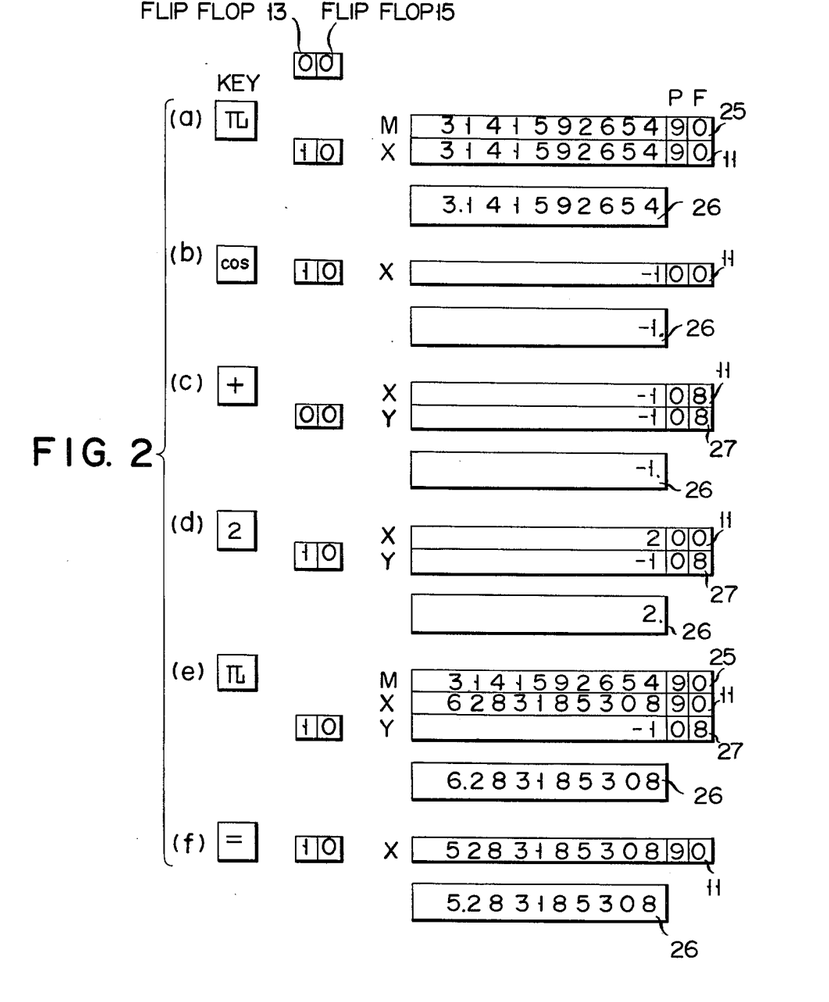
FIGS. 2(a) to 2(f) and FIGS. 3(a) to 3(g) comparatively illustrate key operations and the contents of the corresponding registers to aid in explaining the operation of the key input control apparatus shown in FIG. 1.

Subsequently, the + key is operated, as shown in FIG. 2(c), upon the + key operation, the output line 6e of the input processing unit 6 produces function data of "+" for transmission to the control unit 4. In turn, the control unit 4 sends a control signal to the arithmetic logic circuit 23 to load a coded signal, which is the function data, representing "8", for example, into the flag F of the X register 11. The contents of the X register 11 is transferred to the Y register 27. The operation of the "+" function key causes the output line 6g of the input processing unit 6 to deliver a second function signal thereby to reset the flip-flop 13. As shown in FIG. 2(d), when the numerical key 2 for numeral "2" is operated, the input processing unit 6 produces the numerical data of "2" through the output line 6a which in turn is loaded into the X register 11, while at the same time it delivers through the output line 6b a numerical key signal to set the flip-flop 13 via the OR circuit 12. Then, numeral "2" is loaded into the X register 11 so that "2" is displayed by the display unit.

Then, the $\boxed{\pi}$ key 7 is depressed, as shown in FIG. 2(e) to produce a key signal which drives the code signal generator 14 to produce the numerical data of "3.1415...". The numeral data produced is loaded into the M register 25 during one word time. As this loading ends, the delay circuit 19 produces a $\boxed{\pi}$ key signal for one word time which is then applied to the AND circuits 16 and 17. At this time, the key operation immediately before the $\boxed{\pi}$ key operation, that is to say, the operation of the numerical key $\boxed{2}$, has set the flip-flop 13 and a signal "1" at the output Q of the flip-flop 13 has been applied to the AND circuit 17. Accordingly, when the delay circuit 19 produces a $\boxed{\pi}$ key signal, the AND circuit 17 produces a "1" signal. At this time, the flip-flop 15 has been reset to have a signal "1" at the output $\overline{Q}$ which also appears at the AND circuit 22. Accordingly, the output signal from the AND gate 17 is applied as a multiplication processing command to the arithmetic logic circuit 23, through the AND gates 22 and 24. As a result, the arithmetic logic circuit 23 operates in a multiplication mode to multiply the numerical data "2" held in the X register 11 by the pi numeral "3.141592..." held in the M register 25. The result of the multiplication, "6.283185308" is then loaded into the X register 11.

Then, the $\boxed{=}$ key is operated, as shown in FIG. 2(f). The key operation then drives the input processing unit 6 to transfer the function data of a plurality of bits corresponding to the $\boxed{=}$ key to the control unit 4. Under control of the output signal from the control unit 4, the flag data stored in the Y register 27, that is to say, a coded signal 8 representing "+" of an addition flag, causes an addition of the contents of the X register 11 and the contents −1 of the Y register. The result of the addition "5.283185308" is loaded into the X register 11 and displayed by the display unit 26.

As shown in FIGS. 2(d) and 2(e), a succession of the $\boxed{2}$ and $\boxed{\pi}$ key operations executes the operation of "2×π" with omission of the $\boxed{\times}$ key operation. In the case of a general expression "nπ", the successive key operations of the $\boxed{n}$ and $\boxed{\pi}$ keys may execute the operation of "n" without the key operation of the $\boxed{\times}$ key.

Figure 3:
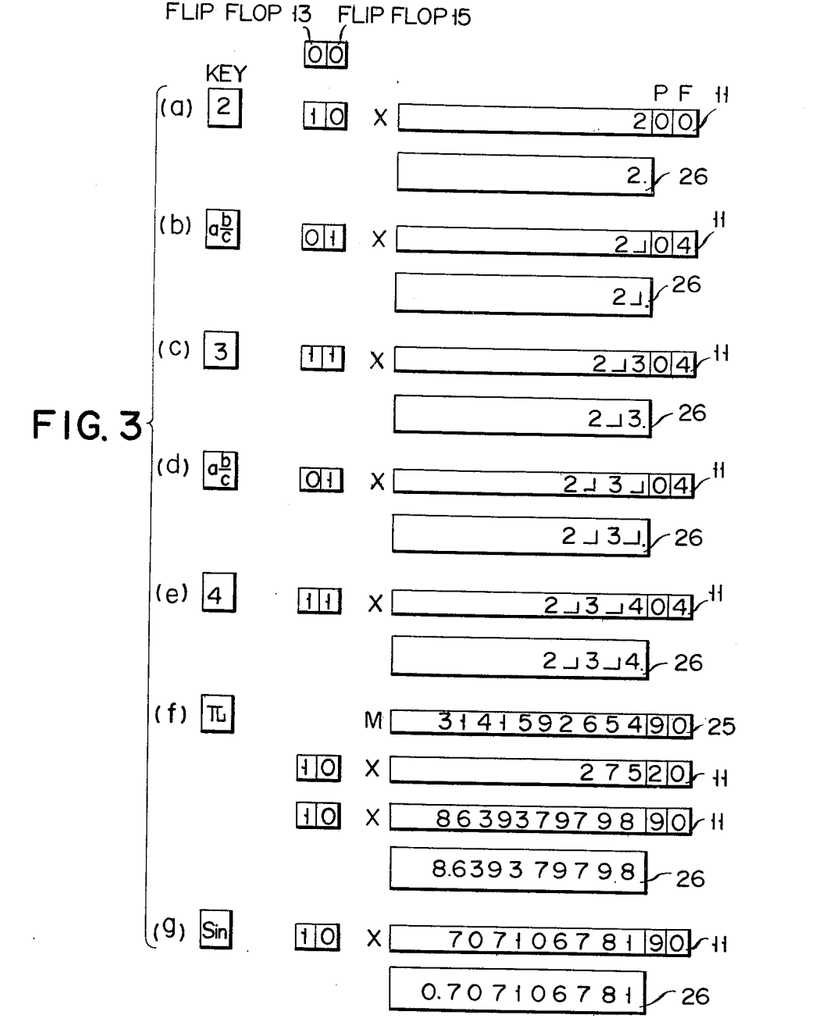

The execution of "sin (2¾) π" will be described with reference to FIGS. 3(a) to 3(g). The keys $\boxed{2}$ $\boxed{a\frac{b}{c}}$ $\boxed{3}$ $\boxed{a\frac{b}{c}}$ $\boxed{4}$ $\boxed{\pi}$ $\boxed{\sin}$ are operated in this order. As shown in FIG. 3(a), the numeral key $\boxed{2}$ key is first operated so that the input processing unit 6 produces the numerical data through the output lines 6a and the numerical data is applied to the X register 11. At this time, the input processing unit 6 also produces through the output line 6b to set the flip-flop 13. Then, the $\boxed{a\frac{b}{c}}$ key 8 is depressed so that the output line 6d of the input processing unit 6 delivers the $\boxed{a\frac{b}{c}}$ key signal to set the flip-flop 15. The $\boxed{a\frac{b}{c}}$ signal is applied to the control unit 4 which in turn produces function data. The function data then controls the operation circuit 23 to produce an output signal by which the contents "2" of the X register 11 is shifted from the first digit to the second digit. Then, a symbol " " representing a fraction is loaded into the first digit while at the same time a coded signal of "4" corresponding to the key $\boxed{a\frac{b}{c}}$ key 8 is set in the flag digit F (FIG. 3(b)). A second function signal outputted through the output line 6g from the input processing unit 6 is applied to the flip-flop 13 to reset the same. Subsequently, the remaining keys $\boxed{3}$ $\boxed{a\frac{b}{c}}$ $\boxed{4}$ are operated and the processings related to the key depressions are performed, as shown in FIGS. 3(c) to 3(e). Consequently, the memory contents representative of "2¾" in the X register 11 are transferred to the display unit 26 where "2   3   4" is displayed. At this time, the flip-flops 13 and 15 have both been set. The $\boxed{a\frac{b}{c}}$ key signal is applied to the counter 28 provided in the control unit 4 which counts the number of the key signals. A previously programmed processing of a fraction is executed in accordance with the count of the counter.

Then, the $\boxed{\pi}$ key 7 is operated, as shown in FIG. 3(f). The input processing unit 6 delivers through the output line 6c a $\boxed{\pi}$ key signal for transmission to the code signal generator 14. Upon receipt of the pi value "3.1415..." is loaded into the M register 25 for the first one word. As the loading into the M register 25 ends, the delay circuit 19 produces a $\boxed{\pi}$ key signal delayed by one word. At this time, since both the flip-flops 13 and 15 have been set, the output of the delay circuit 19 is outputted through the AND gates 17 and 21 and is applied as a fraction processing command to the arithmetic logic circuit 23. As a result, the arithmetic logic circuit 23 operates in the fraction processing mode so that it first calculates the contents "2¾" of the X register to obtain "2.75" which is the result of the calculation. Following the fraction calculation, the control unit 4 produces a fraction processing end signal ⓐ to reset the flip-flop 15. Further, since the [π] key 7 has been operated, the control unit 4 produces the fraction processing end signal ⓐ and another fraction processing end signal ⓑ. Those signals ⓐ and ⓑ are applied as a multiplication command to the arithmetic logic circuit 23 by way of the AND gate 18 and the OR gate 24. Therefore, the arithmetic logic circuit 23 operates in the multiplication mode to multiply the contents "2.75" of the X register 11 by the contents "3.1415..." of the M register 25, thereby to obtain "8.639379798". The product is loaded into the X register and then is displayed by the display unit 26.

Then, the [sin] key is depressed, as shown in FIG. 3(g). The input processing unit 6 delivers through the output lines 6e the function data consisting of a plurality of bits corresponding to the [sin] key which in turn is applied to the control unit 4. Upon the function data, the control unit 4 produces a control signal to control the arithmetic logic circuit 23. Under this control, the circuit 23 calculates the trigonometric function of "sin" relating to the contents stored in the X register 11. The result of the calculation "0.707106781" so fed to the X register 11 and then is displayed by the display unit 26.

In this manner, the entry and the multiplication operations are performed by the depressing the [π] key 17 and therefore the key operations of the key or [π] key to be performed after the operations of the [π] key is operated.

Figure 4:
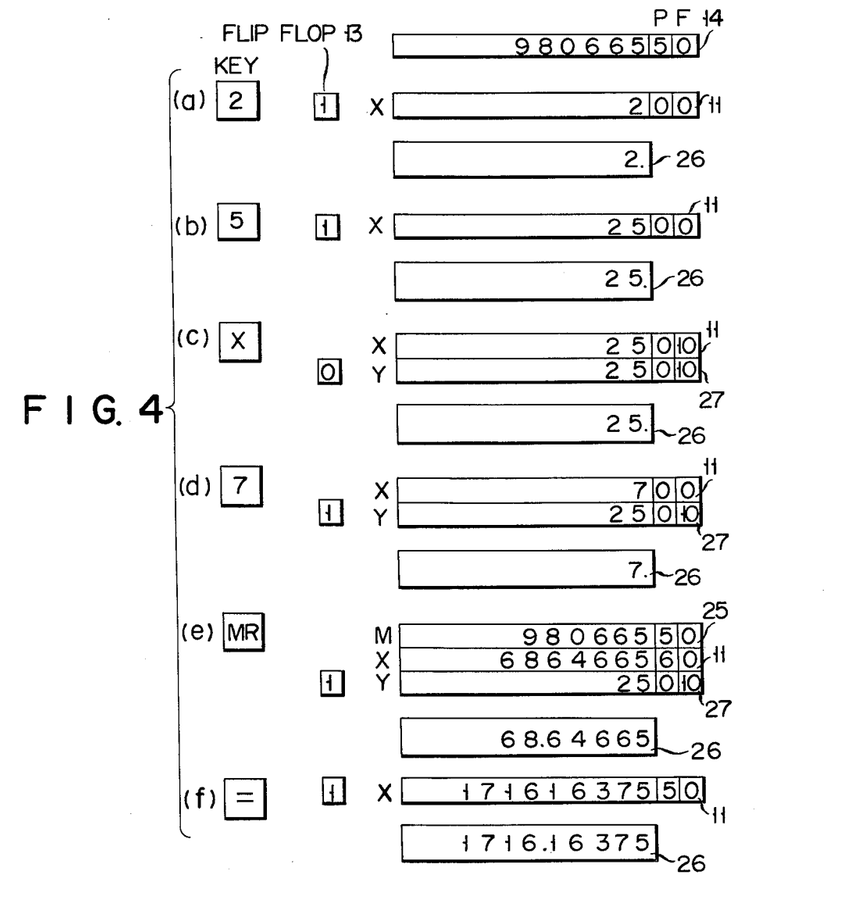
FIG. 4 comparatively illustrates key operations and the contents of the corresponding registers to aid in explaining the operation of another embodiment of the key input control apparatus according to the invention.
Figure 5:
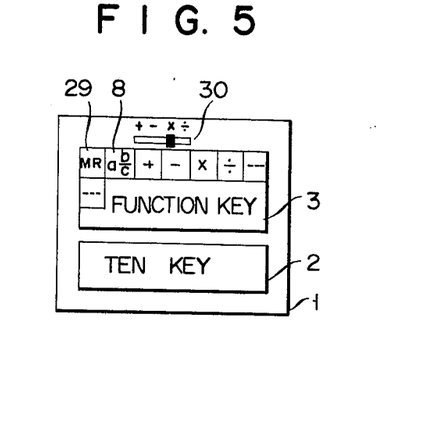
FIG. 5 shows a plan view of another example of a key input unit 1 shown in FIG. 1.

FIG. 4 shows another embodiment of the key control apparatus in which a special key such as an MR key for accessing a memory has a function similar to that of the [π] key 7 and it is used in place of the latter key. In this case the key input section is as shown in FIG. 5. The key operation of the [MR] key operation is used to multiply the contents of the memory by the contents of the X register 11. Accordingly, in this embodiment, if the key signal in the above-mentioned embodiment is used as a MR key signal and the code signal generator 14 is used as a memory, the circuit construction like that in the above-mentioned embodiment may be constructed. Also in this example, the MR key 29 further has a memory recall function like the conventional one. One of those functions of the [MR] key 29 is selected by a mode switch 30 as shown in FIG. 5. FIG. 4 illustrates a series of key operations when the gravitational acceleration g is stored in the memory corresponding to the code signal generator 14 and the mode switch is turned to the side to designate a multiplication to calculate a potential energy. If the mass m of a material is 25 Kg and the height h is 7 m, keys are operated in the order of [2] [5] [×] [7] [MR] [×]. As shown in FIGS. 4(a) and 4(d), a succession of key operations of the keys [2] [5] [×] [7] is carried out, so that numeral 25 is stored in the Y register while at the same time a multiplication code "10" is stored in the flag F of the X register 11, and then numeral "7" is loaded into the X register 11. In FIG. 4(d), a numeral key [7] is operated so that the flip-flop 13 is set.

When the [MR] key 29 is operated, as shown in FIG. 4(e), the input processing unit 6 produces a [MR] key signal which reads out a gravitational acceleration g of "9.80665" stored in the memory and load it into the M register 25. The [MR] key signal is applied to the delay circuit 19 where it is delayed by one word. At this time, the flip-flop 13 is in the set state while the flip-flop 15 is in the reset state. Accordingly, the output signal from the delay circuit 19 is applied as a multiplication command signal to the arithmetic logic circuit 23, through the AND gates 17 and 22 and the OR gate 24. Upon receipt of the multiplication command, the arithmetic logic circuit 23 multiplies the contents of the X register 11 by the contents "9.80665" of the M register 25. The result of the multiplication, "68.64665" is loaded into the X register 11 and is applied to the display unit 26.

Then, the [=] key is operated, as shown in FIG. 4(f). The input processing unit 6 transfers a function key signal to the control unit 4. The control unit 4 executes a control to designate the multiplication designated the contents "10" of the F digit in the Y register 27. The operation circuit multiplies the contents "68.64665" of the X register 11 by the contents "25" of the Y register 27. Through this calculation, the potential energy mgh is calculated to have "1716.16375". The result of the calculation is loaded into the X register 11 while at the same is displayed by the display unit 26.

In this way, a simple key operation may calculate a potential energy of a material. In a small-sized electronic calculator without the [π] key, the pi "3.1415..." is stored in the memory and the operation like the [MR] key 29 may be ensured. Additionally, a series of key operations of keys, for example, [function] [MR] and [=] may be substituted by a single key operation of the [MR] key if a specific numeral is stored and a specific function to be executed is designated by a mode switch.

Figure 6:
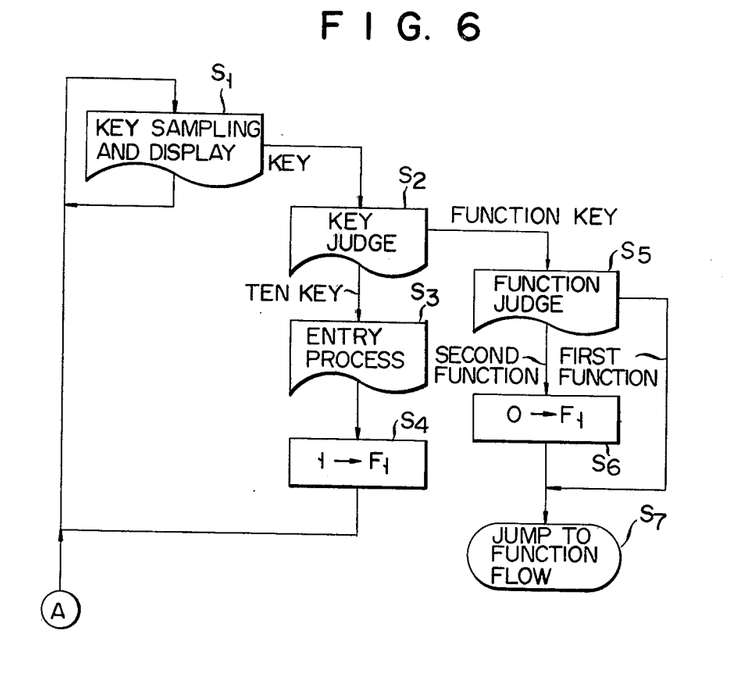
FIGS. 6 and 7 show flow charts useful in explaining the operations of another embodiment of the key intput control apparatus according to the invention.

Turning now to FIG. 6, there is shown a flow chart to aid in explaining the operation of a still another embodiment of the invention. In this example, the key input control apparatus is applied to a small-sized electronic calculator in which a control program is stored in a memory, for example, a read only memory (ROM) for executing a given operation. In the figure, a step S1 designates a key sampling/display step in which key sampling signals are sequentially supplied to a key matrix circuit constituting a key input section to detect an output signal from a key depressed and the contents of the X register (a register for display) is transferred to the display drive circuit. The step S1 is repeated when the key is operated, and, when the key is operated to detect the key signal, it advances to a step S2. The step S2 judges whether the key depressed is one of the ten keys [0] to [9] or one of the function keys such as [+] [sin] [π], or the like. When it is a ten key, the program step advances to the next step S3. The step S3 inputs the numerical data corresponding to the key depressed to the X register while executing a carry processing. The program advances to a step S4 which raises "1" in a flag area F1 indicating that the depressed key is a ten key. Then, the program returns to the step S1. When the step S2 judges that the depressed key is a function key, the program advances to a step S5 to judge a kind of the function key and also judges whether the depression key is the first or the second function key. When it is the second function key, the program advances through a step S6 to a step S7. When it is the first function key, the program advances to a step S6 and then to a step S7. The step S6 loads "0" into the flag area F1 of the X register. In the step S7, the program jumps to a given function flow.

Figure 7:
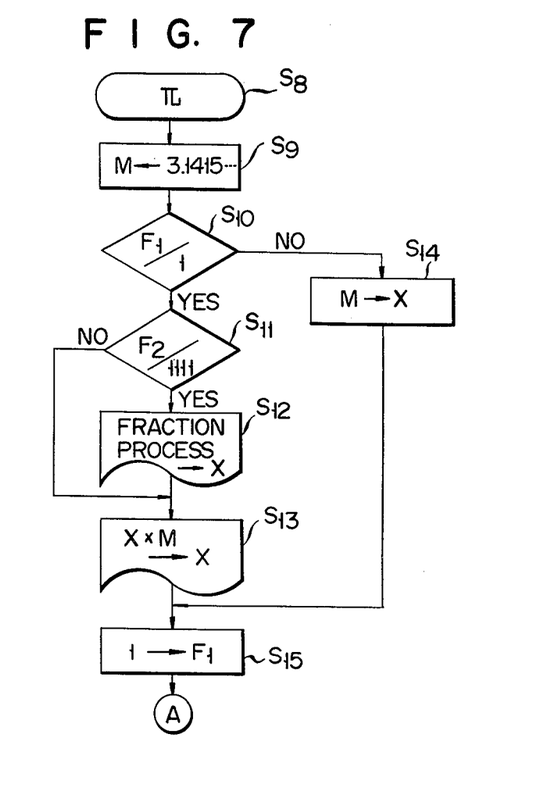

FIG. 7 shows a flow chart to which the program jumps when the  key 7 is operated. A step S9 first loads the pi value "3.1415..." to the M register. Then, the program steps to a step S10 where it is judged whether the key depressed immediately before the  key is operated is a numeral key or the first function key, or the second function key. If it is the second function key, the program advances to a step S14. If it is a numeral key or the first function key, the program steps to a step S11. In the step S14, the value of "$\pi$" stored in the M register is transferred to the X register. When the program advances from the step S10 to the step S11, a flag F2 which counts the number of the depressions of the fraction key $$\boxed{a \frac{b}{c}}$$

judges whether the fraction key $$\boxed{a \frac{b}{c}}$$

is used or not. If it is used, the program advances to a step S12 where the fraction processing is performed in accordance with the number of the fraction key operations. For example, when keys are depressed in this order (the key operations indicate keying in 2¾), the flag F2 stores "2". When keys are operated (indicating keying in ½), the flag F2 stores "1". A kind of the fraction is judged on the basis of the count of the flag F2 and the arithmetic processing is performed on the basis of the result of judgement. When the processing of the step S12 is finished or when the step S11 judges the fraction key is not used, the program advances to a step S13. The step S13 performs a multiplication processing of the contents of the X register by the contents ($\pi$) of the M register, and then steps to a step S15. The step S15 also follows the step S14. The step S15 raises "1" in the flag area F1 of the X register. The flagging is made for the reason that, when a "$\pi$" key operation is followed by another "$\pi$" key operation, the contents of the X register is again multiplied by the contents of the M register. At the end of the processing of the step S15, the program returns to the step S1 where the result of the calculation is displayed and the key input control apparatus is ready for for the next keying-in operation.

When the [π] key operation commands a normal entry of the value of "$\pi$", that is to say, in the case of the first entry, or when the [π] key operation follows the second function key operation, the program flows in the order of steps S8—S9—S10—S14—S15 in the flow chart shown in FIG. 6. When the [π] key operation commands an automatic multiplication of the numerical data already inputted by the value of pi, the program flows in the order of steps S8—S9—S10—S11—(S1-2)—S13—S15. In the program flow, the step S12 is executed only when the fraction processing is required.

While the embodiments have been described relating to only the "$\pi$" key, the [MR] key may be used in place of the [π] key, when the former has the entry function and the calculation designating function and a microprogram is so designed as to execute such functions. To save the total number of keys used, the [π] key may be replaced by two keys, for example, [INV] and [EXP] keys. In this case, the [EXP] key may be used merely for loading the value of pi into the X register. Through the key operations of [2] [INV] [EXP] keys, "2×3.14" is calculated and the result of the calculation is loaded into the X register. Alternately, a succession of key operation of keys [2] [EXP] [3] may be used to designate the index part "3" (i.e. $3 \times 10^3$).

Figure 8:
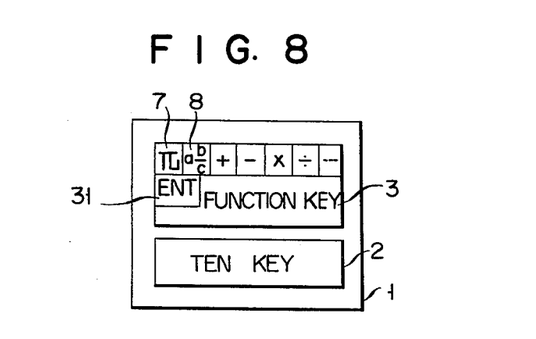
FIG. 8 shows a plan view of a further example of the key input unit 1 shown in FIG. 1.

The present invention is not only applied to the above-mentioned key operation but also to a small-sized electronic calculator having an [ENT] key 31, as shown in FIG. 8, to allow a succession of key operations, for example, [2] [π] [ENT] [3] [+] ($2\pi+3$).

What is claimed is:

1. A key input control apparatus comprising:
   key input means (1) having keys including function keys and a special key, said keys producing electrical signals corresponding respectively to the keys depressed, the special key having a constant number entry function and an arithmetic operation designating function;
   memory means (6, 15, 13) coupled to said key input means for storing said signals provided from said key input means, which stored signals correspond to keys of said key input means which are depressed in the order of the key operations;
   designating means (21, 22, 17, 16) coupled to said memory means and to said key input means and which is responsive to operation of said special key for selectively designating a constant number data inputting function or an arithmetic operation designating function, in accordance with said signals which have been stored in said memory means, which stored signals correspond to the keys of said key input means which have been depressed;
   function execution means (24, 18, 20, 11, 23, 27) coupled to said memory means and to said designating means for executing a function specified by said designating means; and
   display means (26) coupled to said key input means and to said function execution means for selectively displaying one of data keyed in from said key input means and the results of the function executed by said function execution means on the basis of the data keyed in from said key input means.

2. The key input control apparatus of claim 1, wherein said keys of said key input means are divided into a first key group and a second key group, and said designating means includes means to designate the constant number entry function and/or the arithmetic operation designating function when said special key is depressed, depending on whether a key depressed before said special key is depressed belongs to said first key group or said second key group.

3. The key input control apparatus of claim 2, wherein said first key group of said key input means includes numerical data entry keys and a portion of the function keys of said key input means, said function keys producing such a command signal that, when the keys of said key input means are operated, a given calculation is performed to produce a final result of a calculation, and said second key group includes the remaining function keys of the apparatus.

4. The key input control apparatus of claim 1, wherein said special key, when operated, selectively enters numerical data representing pi with a given number of digits, or designates a given operation.

5. The key input control apparatus of claim 4, wherein said special key with the function to enter the numerical data representing pi produces a command signal to designate a multiplication operation as said given operation.

6. The key input control apparatus of claim 5, wherein said special key with the function to enter the numerical data representing pi produces a command signal for commanding a multiplication operation as said given operation, the multiplication operation being a multiplication of pi by the data being displayed by said display means.

7. The key input control apparatus of claim 5, wherein said special key with the function to enter the numerical data representing pi has a function to produce a command signal which gives a command to execute an operation expressed by an arithmetic expression including arithmetic operators for an arithmetic operation and other operations entered by the keys other than said special key depressed before said special key is depressed and which provides the result of said operation, and said special key has another function to produce a command signal for giving a command to multiply the result of said operation by the numerical data representing pi.

8. The key input control apparatus of claim 7, wherein said special key with the function to enter the numerical data representing pi has a function to produce a command signal which gives a command to execute an operation expressed by an arithmetic expression including arithmetic operators for a division ($\div$) and a fraction (A/B) entered by the keys other than said special key depressed before said special key is depressed and which provides the result of said operation, and said special key has another function to produce a command signal for giving a command to multiply the result of said operation by the numerical data representing pi.

9. The key input control apparatus of claim 1, wherein said designating means includes a temporary memory (14) for temporarily storing given data, and said special key in said key input means is a memory recall key which has a function to recall as entry data the data stored in said temporary memory and another function to execute said arithmetic operation.

10. The key input control apparatus of claim 9, wherein said key input means is further provided with a mode switch to designate a kind of an operation, and said special key operating as a memory recall key has a function to produce a command signal to command the execution of said kind of operation designated by said mode switch.

11. The key input control apparatus of claim 10, wherein said special key operating as a memory recall key has a function to produce a command signal for commanding an operation specified by said mode switch for the recalled data and the data.

12. The key input control apparatus of claim 9, wherein said special key operating as a memory recall key has a function to produce a command signal which gives a command to execute an operation expressed by an arithmetic expression including arithmetic operators for an arithmetic operation and other operations entered by the keys other than said special key depressed before said special key is depressed and which provides the result of the operation, and has another function to produce a command signal for giving a command to execute an operation specified by said mode switch for the result of the operation and the recalled data.

13. The key input control apparatus of claim 12, wherein said special key operating as a memory recall key has a function to produce a command signal which gives a command to execute an operation expressed by an arithmetic expression including arithmetic operators for a division ($\div$) and a fraction (A/B) entered by the keys other than said special key depressed before said special key is depressed and which provides the result of the operation, and has another function to produce a command signal for giving a command to execute an operation specified by said mode switch for the result of the operation and the recalled data.

14. The key input control apparatus of claim 1, wherein said memory means (6, 15, 13) stores signals corresponding to a kind of the key operated, said signals being sequentially updated each time a new key is operated, and said designating means designating a given operation function responsive to an output signal from said memory means which is determined by the key other than said special key which is operated immediately before said special key is operated.

15. The key input control apparatus of claim 14, wherein said memory means (6, 15, 13) includes a flip-flop type memory element which is set or reset in accordance with a kind of the key depressed in said key input means.

16. The key input control apparatus of claim 14, wherein said memory means includes a flag register for storing a code in accordance with a kind of the key depressed in said key input means.

17. A key input control apparatus comprising:
key input means having keys including function keys, a special key having a constant number entry function and an arithmetic operation designating function, and an entry key to execute an operation by depression of the entry key to enter a first operand data after a first operand data is registered and by depression of a function key after a second operand data is registered, said keys of said key input means producing signals when depressed;
memory means (6, 15, 13) coupled to said key input means for storing signals provided from the keys of said key input means which are depressed, in the order of the key depressions;
designating means (16, 17, 21, 22) coupled to said memory means and to said key input means for selectively designating one of said functions of said special key in accordance with said signals which have been stored in said memory means, which stored signals correspond to the keys of said key input means which have been depressed;

function execution means (24, 18, 20, 11, 23, 27) coupled to said memory means and to said designating means for executing a function specified by said designating means; and display means (26) coupled to said key input means and to said function execution means for selectively displaying one of data entered from said key input means and the result of the function which is executed by said function execution means on the basis of the data keyed in from said key input means.

* * * * *